(12) United States Patent  
Fujii et al.

(10) Patent No.: US 8,167,493 B2  
(45) Date of Patent: May 1, 2012

(54) BALL SPLINE

(75) Inventors: Hideki Fujii, Yamanashi (JP); Hironori Shoji, Tokyo (JP); Satoru Nagai, Tokyo (JP); Yoshitaka Takahashi, Chiba (JP)

(73) Assignee: Thk Co., Ltd., Tokyo (JP)

( * ) Notice: Subject to any disclaimer, the term of this patent is extended or adjusted under 35 U.S.C. 154(b) by 973 days.

(21) Appl. No.: 10/583,411

(22) PCT Filed: Nov. 15, 2004

(86) PCT No.: PCT/JP2004/016923

§ 371 (c)(1),
(2), (4) Date: Jun. 4, 2007

(87) PCT Pub. No.: WO2005/066511

PCT Pub. Date: Jul. 21, 2005

(65) Prior Publication Data

US 2007/0223846 A1    Sep. 27, 2007

(30) Foreign Application Priority Data

Dec. 26, 2003  (JP) .................................. 2003-434600

(51) Int. Cl.
*F16C 29/06* (2006.01)

(52) U.S. Cl. .......................................... 384/45; 464/168

(58) Field of Classification Search .................... 384/43, 384/45; 403/359.1, 359.6; 464/167, 168
See application file for complete search history.

(56) References Cited

U.S. PATENT DOCUMENTS 2,908,152 A * 10/1959 Anderson ..................... 464/168
3,143,867 A    8/1964 Anderson
4,127,309 A * 11/1978 Teramachi ..................... 384/45
4,764,032 A *  8/1988 Tanaka ........................... 384/44
4,983,049 A *  1/1991 Lecomte ........................ 384/45

FOREIGN PATENT DOCUMENTS

| JP | 53-24937    |   | 3/1978  |
|----|-------------|---|---------|
| JP | 53-24937 A  |   | 3/1978  |
| JP | 58-137616   |   | 8/1983  |
| JP | 61-179414   |   | 11/1986 |
| JP | 06-241228   |   | 8/1994  |
| JP | 06-241228 A |   | 8/1994  |
| JP | 9-229064    | * | 9/1997  |
| JP | 10-196652   |   | 7/1998  |
| JP | 10-196652 A |   | 7/1998  |

OTHER PUBLICATIONS

International Search Report mailed Feb. 8, 2005 of International Application PCT/JP2004/016923.

* cited by examiner

*Primary Examiner* — William C Joyce
(74) *Attorney, Agent, or Firm* — Westerman, Hattori, Daniels & Adrian, LLP

(57) ABSTRACT a ball spline enabling easy machining of a spline shaft by drawing and manufacturable at low cost. The ball spline includes a spline shaft in which multiple lines of ball rolling faces are formed along the longitudinal direction; and a spline nut having a hollow hole for inserting the spline shaft therein, having load rolling faces opposed to the ball rolling faces of the spline shaft. Multiple lines of torque transmission grooves along the longitudinal direction are formed at equal intervals around the spline shaft, and the ball rolling faces are formed on the lateral both sides of these torque transmission grooves. Further, a distance between a pair of ball rows rolling on both sides of the land parts of the spline shaft is set larger than a distance between a pair of ball rows rolling on both sides of the torque transmission grooves.

6 Claims, 8 Drawing Sheets

BALL SPLINE

TECHNICAL FIELD

The present invention relates to a ball spline in which a spline shaft and a spline nut are combined with each other through the intermediation of a large number of balls so as to be capable of relative linear movement and which is for use in linear guide portions in machine tools and various industrial machines, torque transmitting portions in industrial robots, etc. and more specifically, to a technique for efficiently effecting torque transmission between the spline shaft and the spline nut.

BACKGROUND ART

Japanese Patent Document 1: JP 58-137616 A
Japanese Patent Document 2: Japanese Utility Model Application Laid-open No. Sho 61-179414

Known conventional examples of a ball spline of this type are disclosed in JP 58-137616 A, Japanese Utility Model Application Laid-open No. Sho 61-179414, etc. Each of these ball splines is composed of a spline shaft equipped with a plurality of lines of ball rolling faces extending in the longitudinal direction, and a spline nut assembled to the spline shaft through the intermediation of a large number of balls and equipped with endless circulation paths for the balls, with the spline nut being freely movable around the spline shaft in the longitudinal direction thereof as the balls make endless circulation.

A ball spline is characterized not merely in that the spline nut can freely make a linear movement along the spline shaft but also in that mutual transmission of torque is possible between the spline shaft and the spline nut with respect to the circumferential direction of the spline shaft. In the ball spline as disclosed in Japanese Utility Model Application Laid-open No. Sho 61-179414, to allow transmission of larger torque between the spline nut and the spline shaft, longitudinally extending ridge portions are provided at three circumferential positions of the spline shaft, which has a substantially cylindrical sectional configuration, and at the base of each ridge portion, there are provided a pair of ball rolling faces on both sides of the ridge portion. In the ball spline as disclosed in JP 58-137616 A, the spline shaft itself has a substantially rectangular sectional configuration, and there are provided in both side surfaces thereof longitudinally extending wide groove portions, with a pair of ball rolling faces being provided with respect to the corners of these groove portions.

DISCLOSURE OF THE INVENTION

Problems to be Solved by the Invention

As stated above, ridge portions and groove portions are formed on the peripheral surface of a spline shaft, so drawing is often performed in forming a long spline shaft. That is, the sectional configuration of a spline shaft is formed by drawing, and then ball rolling faces are formed at predetermined positions by grinding. It should be noted, however, that when ridge portions are provided at three circumferential positions of a round shaft, it means that groove portions whose width is larger than that of the ridge portions are formed between the adjacent ridge portions, so that the sectional area reduction ratio of the shaft material as a result of the drawing is rather large, resulting in a rather poor machining efficiency. The same problem is involved in the case in which wide groove portions are provided in both side surfaces of a bar material with a substantially rectangular sectional configuration.

Further, when a spline is in use, both ends of the spline shaft are borne by other structures, so it is necessary to perform an end machining thereon in conformity with the mode of bearing; when the sectional configuration of the spline shaft is not cylindrical but rectangular, the end machining to be performed on the shaft ends takes so much the longer time, resulting in a rather high production cost.

On the other hand, in the ball spline as disclosed in Japanese Utility Model Application Laid-open No. Sho 61-179414, regarding the rows of balls rolling on a pair of ball rolling faces provided on both sides of each ridge portion of the spline shaft, the contact structure for the rows of balls with respect to the ball rolling faces is similar to the contact structure in the face-to-face duplex construction (DF type) of an angular contact ball bearing. Therefore, when torque transmission is effected between the spline nut and the spline shaft, the spline nut is likely to be displaced in the circumferential direction of the spline shaft, and in the case of the transmission of large torque, there may be involved a shortage of rigidity between the spline shaft and the spline nut.

In contrast, in the ball spline as disclosed in JP 58-137616 A, regarding four rows of balls rolling on the ball rolling faces formed on the spline shaft, the contact structure for these ball rows with respect to the ball rolling faces is similar to the contact structure of the back-to-back duplex construction (DB type) of the angular contact ball bearing. Therefore, as compared with the above-described ball spline as disclosed in Japanese Utility Model Application Laid-open No. Sho 61-179414, it is possible to secure a sufficient level of rigidity between the spline shaft and the spline nut. On the other hand, as compared with the case of a spline shaft with a circular sectional configuration, in the case of a spline shaft with a substantially rectangular sectional configuration, the sectional area cannot help but be small if the maximum diameter is the same, and the geometrical moment of inertia is so much the smaller, which is disadvantageous as far as the flexural rigidity of the spline shaft is concerned.

The present invention has been made in view of the above problems in the prior art. It is an object of the present invention to provide a ball spline in which the machining of the spline shaft by drawing is easy to perform and in which it is possible to achieve a reduction in production cost.

Another object of the present invention is to provide a ball spline in which it is possible to sufficiently enhance the rigidity between the spline shaft and the spline nut at the time of transmission of torque and in which it is also possible to secure a sufficient level of flexural rigidity for the spline shaft.

Means for Solving the Problems

That is, a ball spline according to the present invention includes: a spline shaft having a plurality of lines of ball rolling faces extending in a longitudinal direction; and a spline nut formed substantially as a cylinder with a hollow hole into which the spline shaft is fitted, having on an inner peripheral surface of the hollow hole load rolling faces opposed to the ball rolling faces of the spline shaft, and being assembled to the spline shaft through the intermediation of a large number of balls, in which the spline shaft has a substantially circular sectional configuration. The spline shaft has in its periphery a plurality of lines of longitudinally extending torque transmission grooves arranged at equal intervals, with the ball rolling faces being formed on side surfaces of land parts situated between the torque transmission grooves, that is, on both sides in the width direction of each torque transmission grooves. Further, the distance between a pair of rows of balls rolling on both sides of each of the land parts is set larger than the distance between a pair of rows of balls rolling on both sides of each of the torque transmission grooves.

In the ball spline of the present invention, constructed as described above, when producing the spline shaft by drawing, it is possible to reduce the sectional area reduction ratio of the shaft material as a result of the drawing, thereby making it possible to enhance the machining efficiency in the drawing. Further, the spline shaft has a substantially circular sectional configuration, so the drawing can be performed by using a round shaft as a material, and the end machining to be performed on the spline shaft after the drawing can be conducted efficiently.

In the present invention described above, the number of torque transmission grooves formed in the periphery of the spline shaft may be two or more. However, from the viewpoint of the balance when transmitting torque between the spline shaft and the spline nut, and from the viewpoint of uniformalizing the load capacity for the radial load acting on the spline nut in the circumferential direction of the spline nut, it is desirable for the number of torque transmission grooves to be three.

The spline nut may be of an unlimited stroke type which is equipped with an endless circulation path for the balls, or of a limited stroke type which is equipped with no such endless circulation path. In either type, from the viewpoint of preventing the balls from coming into contact with each other to suppress fluctuation in the sliding resistance of the spline nut and to suppress generation of noise, it is desirable for the balls to be arranged in a row at predetermined intervals on a coupling belt. It is desirable for the coupling belt to be formed of a flexible material, such as resin; when the spline nut is of the limited stroke type mentioned above, it may be formed of a material with no flexibility, such as a metal plate.

Further, when providing the spline nut with an endless circulation path for the balls, from the viewpoint of achieving a reduction in the size of the spline nut, it is desirable for the pair of endless circulation paths situated at both sides of each torque transmission groove of the spline shaft to cross each other such that one endless circulation path passes through the other endless circulation path, thereby making the endless circulation paths compact with respect to the spline nut.

Furthermore, to obtain a compact ball spline by reducing the radial wall thickness of the spline nut, it is desirable for the endless circulation paths for the balls to be situated in a tangential plane with respect to the outer peripheral surface of the spline shaft.

The balls may be held in contact with the spline shaft in any direction. However, taking into account the rigidity of the spline nut with respect to the spline shaft, regarding the pair of ball rows rolling on both side surfaces of land parts of the spline shaft, it is desirable for the intersection of the contact normals with respect to the ball rolling faces to be situated on the outer side of the line connecting the centers of these ball rows with respect to the radial direction of the spline shaft. In this construction, the ball contact structure with respect to the spline shaft is similar to that of the DB-type angular contact ball bearing, thereby making it possible to achieve an improvement in terms of the rigidity between the spline nut and the spline shaft at the time of torque transmission.

In the ball spline of the present invention constructed as described above, in producing the spline shaft by drawing, the sectional area reduction ratio of the shaft as a result of the machining is reduced, so it is possible to enhance the machining efficiency in the drawing. Further, when performing end machining on the spline shaft after the drawing, the end machining can be effected efficiently, thereby making it possible to achieve a reduction in production cost.

Further, by forming the spline shaft in a substantially circular sectional configuration, it is possible to obtain a large geometrical moment of inertia while suppressing an increase in diameter, and it is possible to secure to a sufficient degree the flexural rigidity of the spline shaft while avoiding an increase in the size of the ball spline.

Further, in the ball spline of the present invention, the ball contact structure with respect to the spline shaft is similar to that of a DB-type angular contact ball bearing, whereby it is possible to sufficiently enhance the rigidity between the spline shaft and the spline nut at the time of torque transmission.

REFERENCE NUMERALS

1 . . . ball spline, 10 . . . spline shaft, 11$a$, 11$b$ . . . ball rolling face, 12 . . . torque transmission groove, 13 . . . land part, 20 . . . spline nut, 21$a$, 21$b$ . . . load rolling face, 22 . . . ball return passage, 23 . . . direction changing passage, 30 . . . ball.

BEST MODE FOR CARRYING OUT THE INVENTION

In the following, the ball spline of the present invention will be described in detail with reference to the accompanying drawings.

Figure 1:
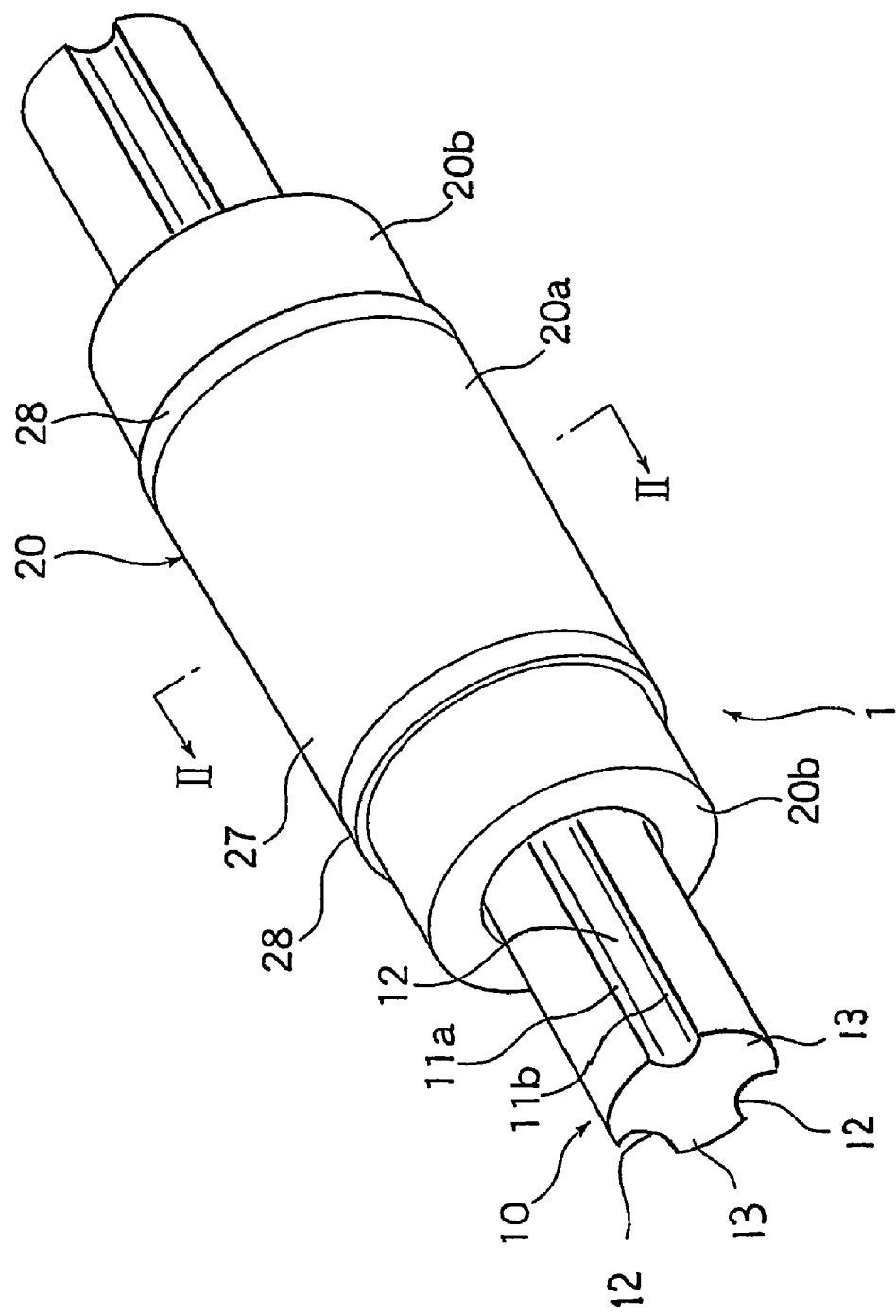
FIG. 1 A perspective view of a ball spline according to a first embodiment of the present invention.
Figure 2:
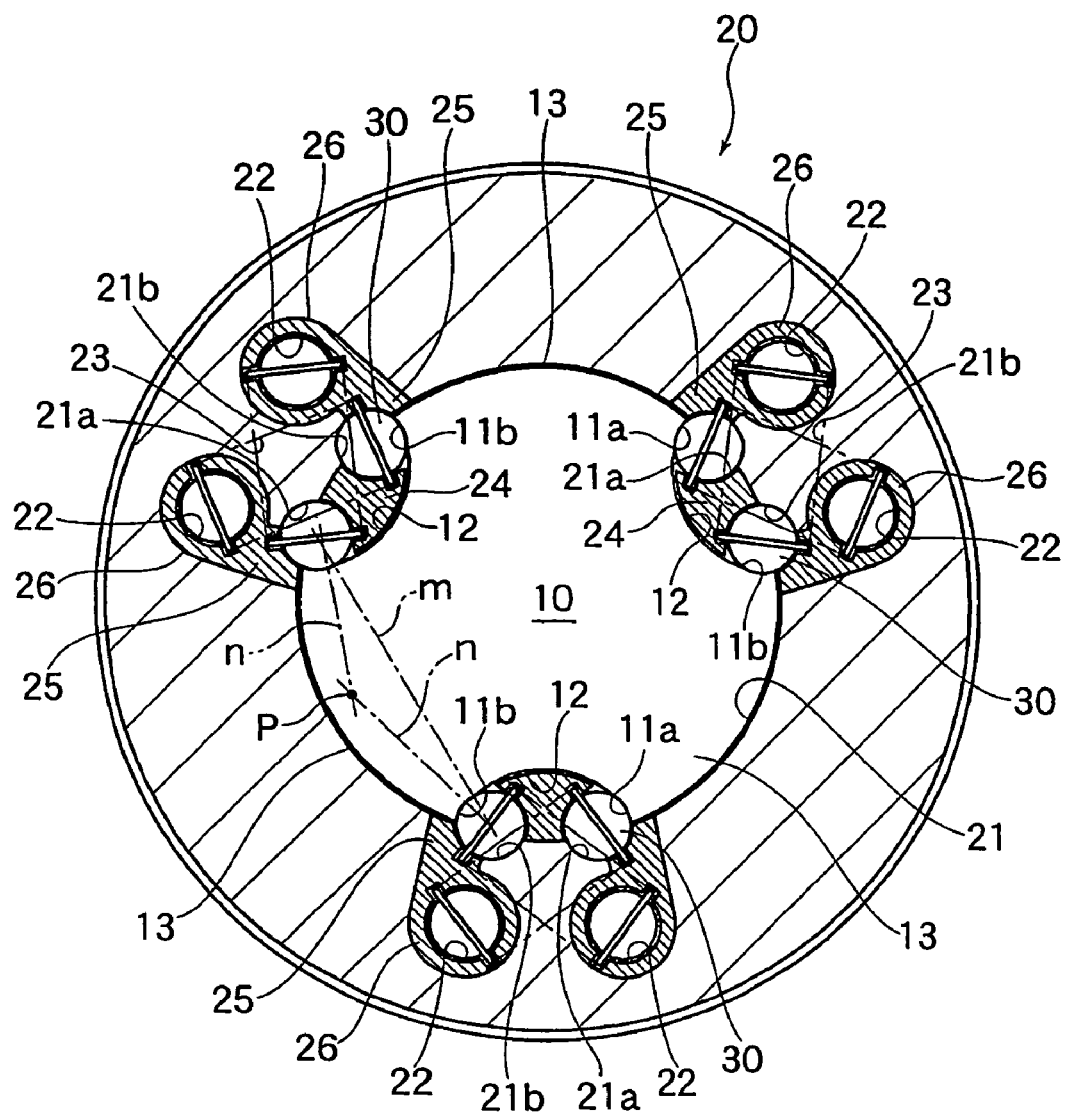
FIG. 2 A sectional view taken along the line II-II of FIG. 1.

FIGS. 1 and 2 are front sectional views showing a ball spline according to the first embodiment, to which the present invention is applied. The ball spline 1 includes a spline shaft 10 having a plurality of lines of longitudinal extending ball rolling faces 11$a$, 11$b$ and a spline nut 20 formed substantially as a cylinder with a hollow hole 21 into which the spline shaft 10 is fitted.

The spline shaft 10 has a substantially circular sectional configuration, and has in the outer peripheral surface thereof three lines of longitudinally extending torque transmission grooves 12. The torque transmission grooves 12 are arranged so as to equally divide the outer peripheral surface of the spline shaft 10 into three portions, with each torque transmission groove 12 being formed by cutting out the outer peripheral surface of the spline shaft 10 into an arcuate shape. On the outer peripheral surface of the spline shaft 10, there exist land parts 13 situated between the adjacent torque transmission grooves 12. In the case in which the width of the land parts 13 is compared with the width of the torque transmission grooves 12, the width of the land parts 13 is set to be larger than the width of the torque transmission grooves 12.

When the spline shaft 10 is thus formed in a substantially circular sectional configuration, it is possible to set the sectional area larger than that of a spline shaft of a substantially square sectional configuration if the maximum diameter is the same, so that it is possible to make the geometrical moment of inertia of the spline shaft 10 so much the larger, thereby making it possible to enhance the flexural rigidity of the spline shaft 10.

On both sides in the width direction of each torque transmission groove 12, the groove walls are substantially perpendicular to the outer peripheral surface of the spline shaft 10, and at these positions, there are formed the ball rolling faces 11a, 11b. That is, a pair of ball rolling faces 11a, 11b are formed at positions on both sides of each torque transmission groove 12; in the spline shaft 10 of this embodiment, there are formed three pairs, that is, six lines in total of ball rolling faces 11a, 11b. The sectional surfaces of the ball rolling faces 11a, 11b are formed as curved surfaces whose curvature is slightly larger than that of the balls rolling thereon.

A hollow hole 21 formed in the spline nut 20 has a sectional configuration substantially matched with the sectional configuration of the spline shaft 10, which is inserted into the hollow hole 21 while leaving a slight gap therebetween. The spline nut 20 has load rolling faces 21a, 21b opposed to the ball rolling faces 11a, 11b of the spline shaft 10. A large number of balls 30 are arranged between the ball rolling faces 11a, 11b and the load rolling faces 21a, 21b, and configured to roll while receiving load between the ball rolling faces 11a, 11b and the load rolling faces 21a, 21b. That is, the ball rolling faces 11a, 11b of the spline shaft 10 and the load rolling faces 21a, 21b of the spline nut 20 are opposed to each other, whereby there are formed load regions where the balls 30 roll while receiving load.

The direction in which load is applied to each ball 30 rolling in the load region, that is, the contact normals n of the balls with respect to the ball rolling faces 11a, 11b of the spline shaft 10 are set substantially perpendicular to the radial direction of the spline shaft 10, and the torque transmission between the spline shaft 10 and the spline nut 20 is effected efficiently. Further, when the contact normals n of the balls 30 with respect to the ball rolling faces 11a, 11b are thus set, in effecting torque transmission between the spline shaft 10 and the spline nut 20, the balls 30 are not displaced in the radial direction of the spline shaft 10 on the ball rolling faces 11a, 11b, so it is possible to assemble the spline nut 20 to the spline shaft 10 with high rigidity with respect to the circumferential direction of the spline shaft 10. Thus, when the spline shaft 10 is rotated, it is possible to accurately transmit the rotation angle to the spline nut 20. It is not always necessary for the contact normals n of the balls 30 with respect to the ball rolling faces 11a, 11b to be set substantially perpendicular to the radial direction of the spline shaft 10.

Here, of the balls 30 rolling on the pair of ball rolling faces 11a, 11b formed on both sides of each torque transmission groove 12 of the spline shaft 10, the balls rolling one ball rolling face 11a receive counterclockwise torque acting on the spline nut, and the balls rolling on the other ball rolling face 11b receive clockwise torque.

The balls 30 receiving the clockwise torque and the balls 30 receiving the counterclockwise torque are opposed to each other with the land part 13 of the spline shaft 10 therebetween; the intersection P of the contact normals n of the balls 30 is situated on the outer side of the line m connecting the centers of these balls with respect to the radial direction of the spline shaft 10. That is, the ball rows situated on both sides of each land part 13 of the spline shaft 10 hold the land part 13 so as to thrust it toward the outer side in the radial direction of the spline shaft 10; this alone helps to maintain high rigidity between the spline shaft 10 and the spline nut 20, thereby making it possible to suppress to a minimum the displacement of the spline nut 20 when a radial load or torque is applied thereto.

Figure 3:
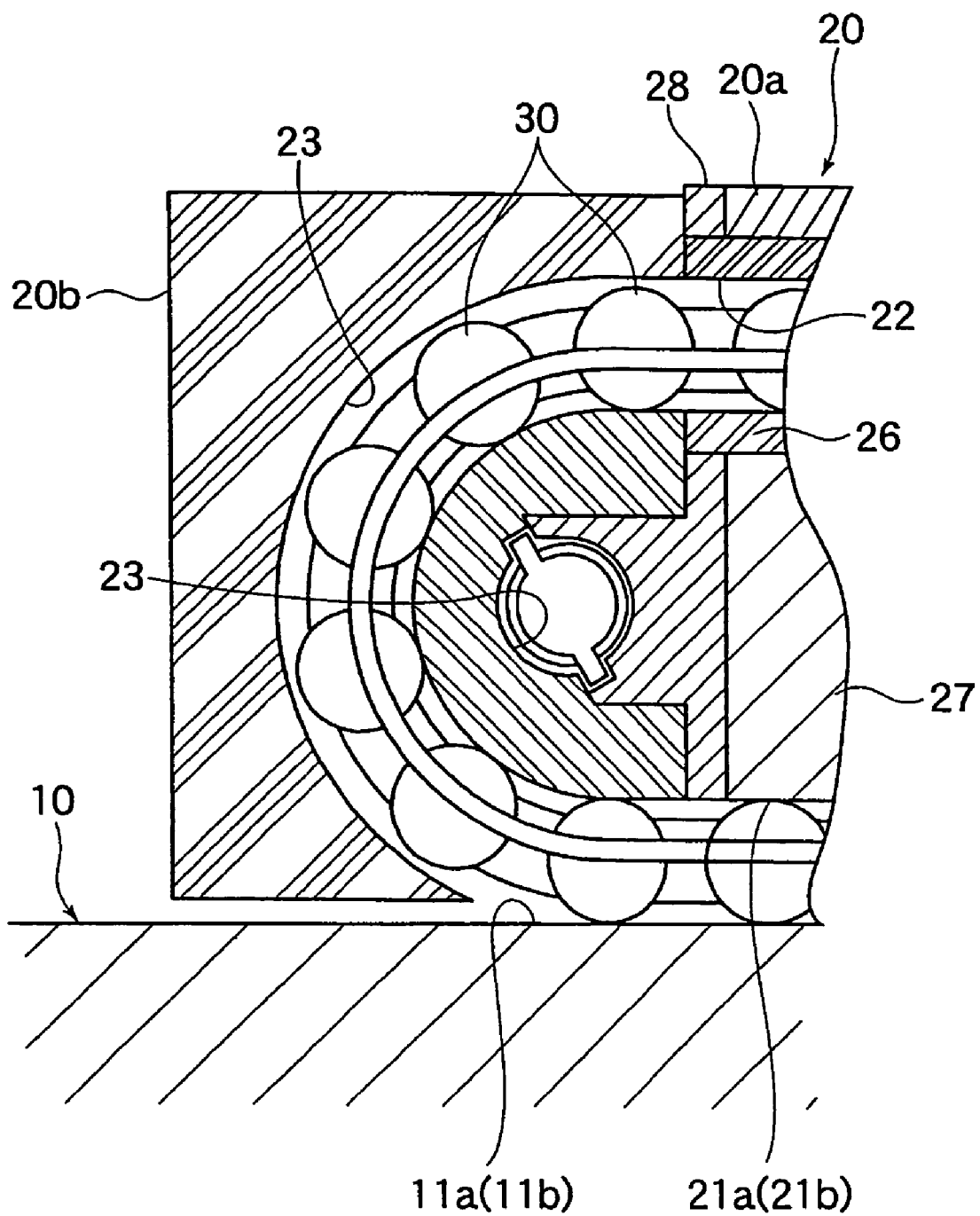
FIG. 3 A sectional view taken along the line III-III of FIG. 2.

Further, formed in the spline nut 20 are ball return passages 22 through which the balls 30 roll in a non-load state. The ball return passages 22 are formed parallel to the load regions, and are situated in the contact normals n of the balls 30 and the ball rolling faces 11a, 11b. Further, to send the balls 30 having rolled through the load regions into the ball return passages 22, the load regions and the ball return passages 22 are connected by arcuate direction changing passages 23. As shown in FIG. 3, the direction changing passages 23 of this embodiment are formed in an arcuate configuration of a substantially fixed curvature. However, this should not be construed restrictively; they may also be formed, for example, in a configuration including a straight portion.

As shown in FIG. 3, the spline nut 20 is formed by a nut main body 20a and a pair of end caps 20b attached to the axial ends of the nut main body 20a; the load rolling faces 21a, 21b and the ball return passages 22 are formed in the nut main body 20a, and the direction changing passages 23 are formed in the end caps 20b. By attaching the end caps 20b to the axial ends of the nut main body 20a, each load rolling face 21a and the ball return passage 22 corresponding thereto are connected together, thereby completing an endless circulation path for circulating the balls 30 having rolled through the load region to the load region again. Thus, when the spline nut 20 moves along the spline shaft 10, the balls 30 circulate through the endless circulation paths, thereby making it possible for the spline nut 20 to freely reciprocate by an arbitrary stroke along the elongated spline shaft 10.

Figure 4A:
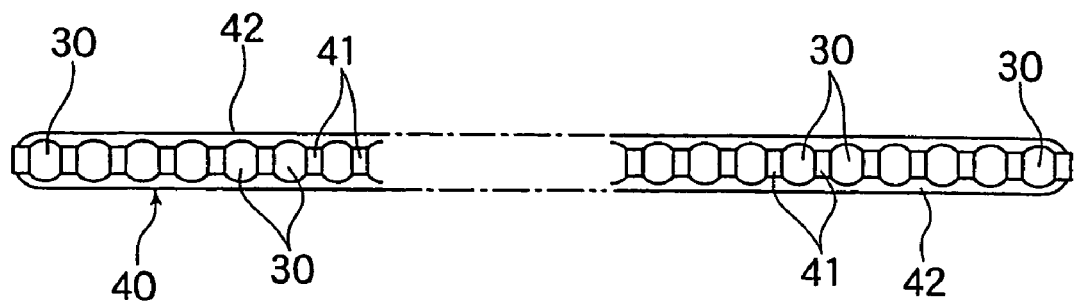
FIG. 4 A plan view and a side view of a ball connecting member with balls arranged thereon.
Figure 4B:
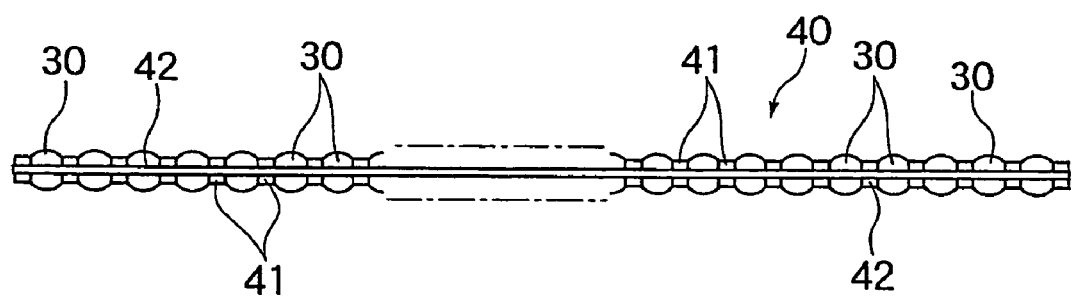

The balls 30 do not fill the endless circulation paths as they are but are, as shown in FIG. 4, arranged in a row on a coupling belt 40 formed of a flexible synthetic resin to be inserted into the endless circulation path together with the coupling belt 40. The coupling belt 40 is formed by a plurality of disc-like spacers 41 provided between the adjacent balls 30 and a flat belt member 42 connecting the disc-like spacers 41, and each ball 30 is rotatably retained by a pair of longitudinally adjacent spacers 41, 41. Thus, if the coupling belt 40 is drawn out of the endless circulation path of the spline nut 20, the balls 30 are not detached from the coupling belt 40, thus facilitating handling of the balls 30.

When the balls 30 are arranged on the coupling belt 40 thus constructed, the coupling belt 40 can be freely bent solely in the direction perpendicular to the surface of the belt member 42, but as shown in FIG. 2, the direction changing passages 23 are situated so as to overlap the contact normals n of the balls 30 and the ball rolling surfaces 11a, 11b, so the coupling belt 40 can circulate through the endless circulation path while being naturally bent.

It should be noted, however, that, to reduce the resistance offered to the circulation of the coupling belt 40, it is necessary for the radius of curvature of the direction changing passage 23 connecting the load region and the ball return passage 22 to be set large; for this purpose, it is necessary for the distance between the load region and the ball return passage 22, formed parallel to each other, to be set large. In the ball spline 1 of this embodiment, the contact direction of the balls 30 with respect to the ball rolling faces 11a, 11b of the spline shaft 10 is a direction perpendicular to the radial direction of the spline shaft 10, in other words, the contact direction is on the tangential plane of the outer peripheral surface of the spline shaft 10; further, the direction changing passage 23 is situated so as to overlap the contact normals n of the balls 30 and the ball rolling faces 11a, 11b, so that, even if the distance between the load region and the ball return passage 22 is set large, the ball return passage 22 does not protrude greatly outwards in the radial direction of the spline nut 20, and it is possible to suppress an increase in the outer diameter of the spline nut 20 accordingly.

When the distance between the load region and the ball return passage 22 is set large, there is a fear of mutual interference between the direction changing passage 23 of the endless circulation path for the balls 30 receiving clockwise torque of the spline nut 20 and that of the endless circulation path for the balls 30 receiving counterclockwise torque thereof. However, in the ball spline of this embodiment, the forming position of one endless circulation path is deviated in the axial direction of the spline nut 20 with respect to the forming position of the other endless circulation path, and one endless circulation path passes through the other endless circulation path, whereby mutual interference of the direction changing passages 23 forming the endless circulation paths is prevented. That is, as shown in FIG. 2, when the spline nut 20 is observed in the axial direction, the direction changing passage 23 for the balls 30 receiving the clockwise torque and the direction changing passage 23 for the balls 30 receiving the counterclockwise torque cross each other; however, as shown in FIG. 3, they are deviated from each other with respect to the axial direction of the spline nut 20, and do not interfere with each other. This also makes it possible for the ball spline 1 of this embodiment to achieve a reduction in the size of the spline nut 20.

In the nut main body 20a constituting a part of the spline nut 20, on both sides of the load rolling faces 21a, 21b, there are formed ball retaining portions 24, 25 formed of synthetic resin. The ball retaining portions 24, 25 prevent the balls 30 situated in the load regions from rolling off the spline nut 20 when the spline nut 20 is detached from the spline shaft 10. Further, to prevent the balls 30 from generating noise when rolling through the ball return passages 22 in a non-load state, the inner peripheral surfaces of the ball return passages 22 are covered with passage forming portions 26 formed of synthetic resin. Further, in the ball retaining portions 24, 25 and the passage forming portions 26, there are axially formed guide grooves for guiding the belt members 42, and the coupling belts 40 circulate through fixed routes without meandering in the endless circulation paths.

The ball retaining portions 24, 25 and the passage forming portions 26 both formed of synthetic resin are formed by insert molding using a metal block portion 27 with the load rolling faces 21a, 21b as a core. Further, as shown in FIG. 3, at the axial end surfaces of the metal block portion 27, there are formed end molding portions 28 of synthetic resin for attaching the end caps 20b, and the end molding portions 28 are connected by the ball retaining portions 24, 25 and the passage forming portions 26. Thus, the ball retaining portions 24, 25, the passage forming portions 26, and the end molding portions 28 are molded integrally so as to surround the metal block portion 27, and are firmly integrated with the metal block portion 27. By thus forming the nut main body 20a by injection molding of synthetic resin, it is possible to achieve a reduction in the weight of the nut main body 20a; further, machining and assembly of the nut main body 20a are facilitated.

Figure 5:
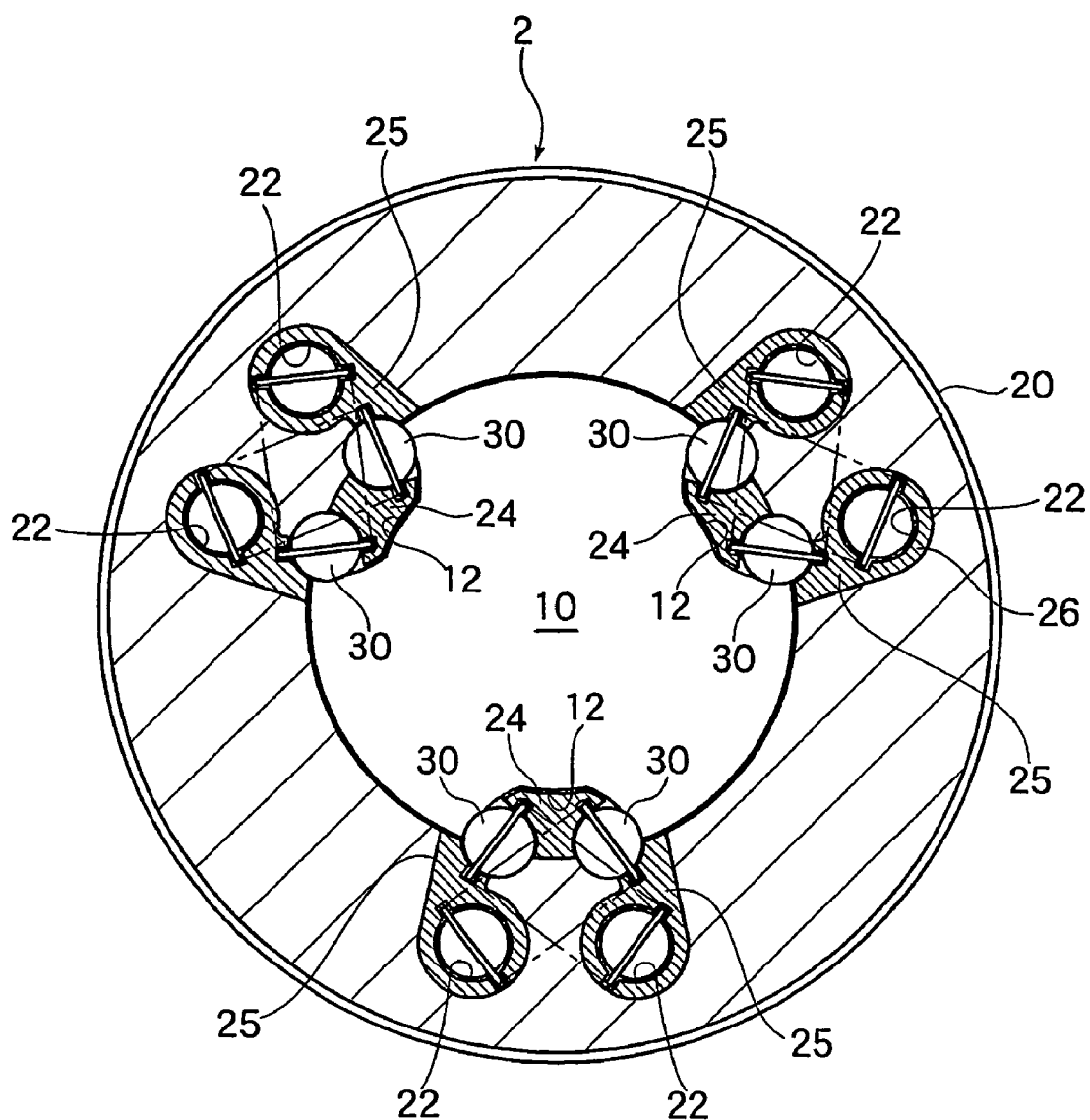
FIG. 5 A front sectional view of a ball spline according to a second embodiment of the present invention.

FIG. 5 shows a ball spline according to the second embodiment of the present invention.

The ball spline 2 of the second embodiment differs from the ball spline of the first embodiment in the configuration of the torque transmission grooves 12 formed in the spline shaft 10; the depth of the torque transmission grooves 12 is smaller. That is, in the present invention, the configuration of the torque transmission grooves 12 of the spline shaft 10 can be arbitrarily changed. If the contact direction of the balls 30 with respect to the spline shaft 10 and the number of ball rows are the same, the smaller the size of the torque transmission grooves 12, the more enhanced is the rigidity of the spline shaft 10 with respect to a radial load. Thus, the rigidity with respect to a radial load is higher in the ball spline 2 of the second embodiment than in the ball spline 1 of the first embodiment. In the drawing, the same reference numerals as those in the first embodiment are used.

Figure 6:
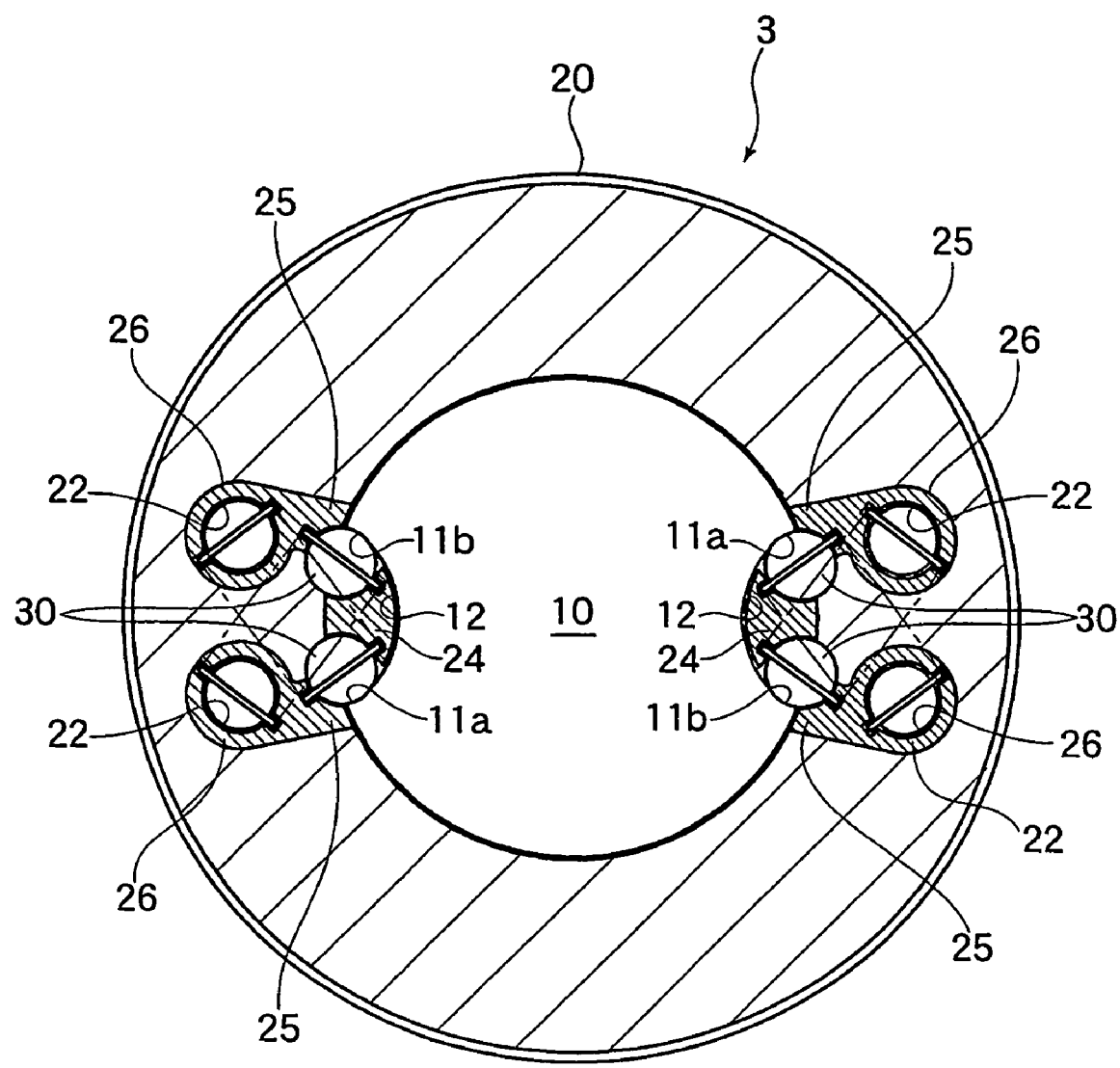
FIG. 6 A front sectional view of a ball spline according to a third embodiment of the present invention.

FIG. 6 shows a ball spline according to the third embodiment of the present invention.

The ball spline 3 of the third embodiment differs from the ball spline 1 of the first embodiment solely in that the number of torque transmission grooves 12 formed in the spline shaft 10 is two. That is, in the outer peripheral surface of the spline shaft 10, there are formed two lines of torque transmission grooves 12 in opposite directions; a pair of ball rolling faces 11a, 11b are formed at both ends in the width direction of each of the torque transmission grooves 12. The contact direction of the balls 30 with respect to the ball rolling faces 11a, 11b is the same as that in the first embodiment. Thus, when a radial load or a torque is applied to the spline nut 20, the number of ball rows that roll while receiving the same is four, which means this ball spline is more suitable for small load uses than the ball spline 1 of the first embodiment. In the drawing, the same reference numerals as those in the first embodiment are used.

Further, since the number of torque transmission grooves 12 is only two in the spline shaft 10 of the third embodiment, machining efficiency in drawing is still more satisfactory.

Figure 7:
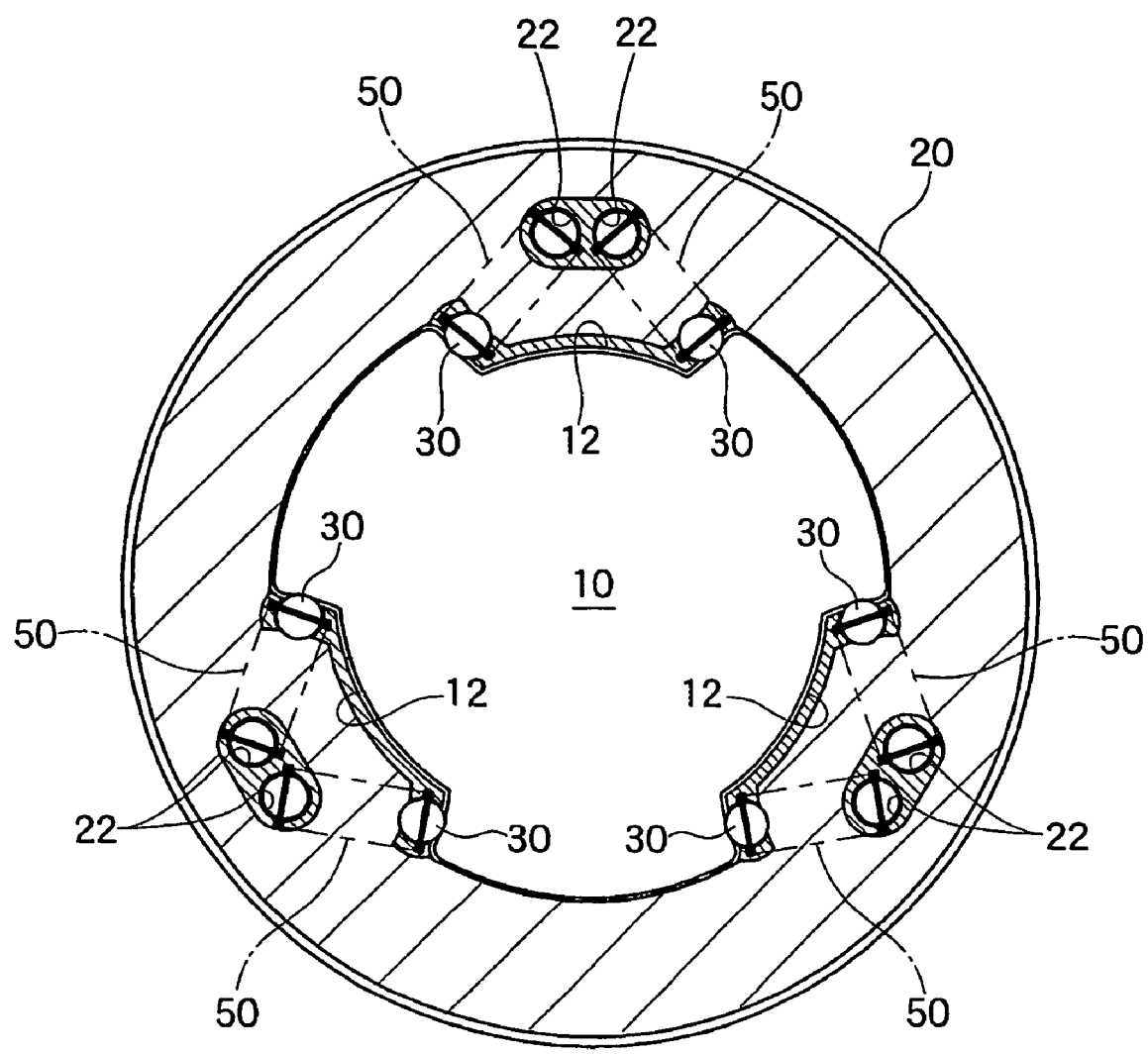
FIG. 7 A front sectional view of a ball spline according to a fourth embodiment of the present invention.
Figure 8:
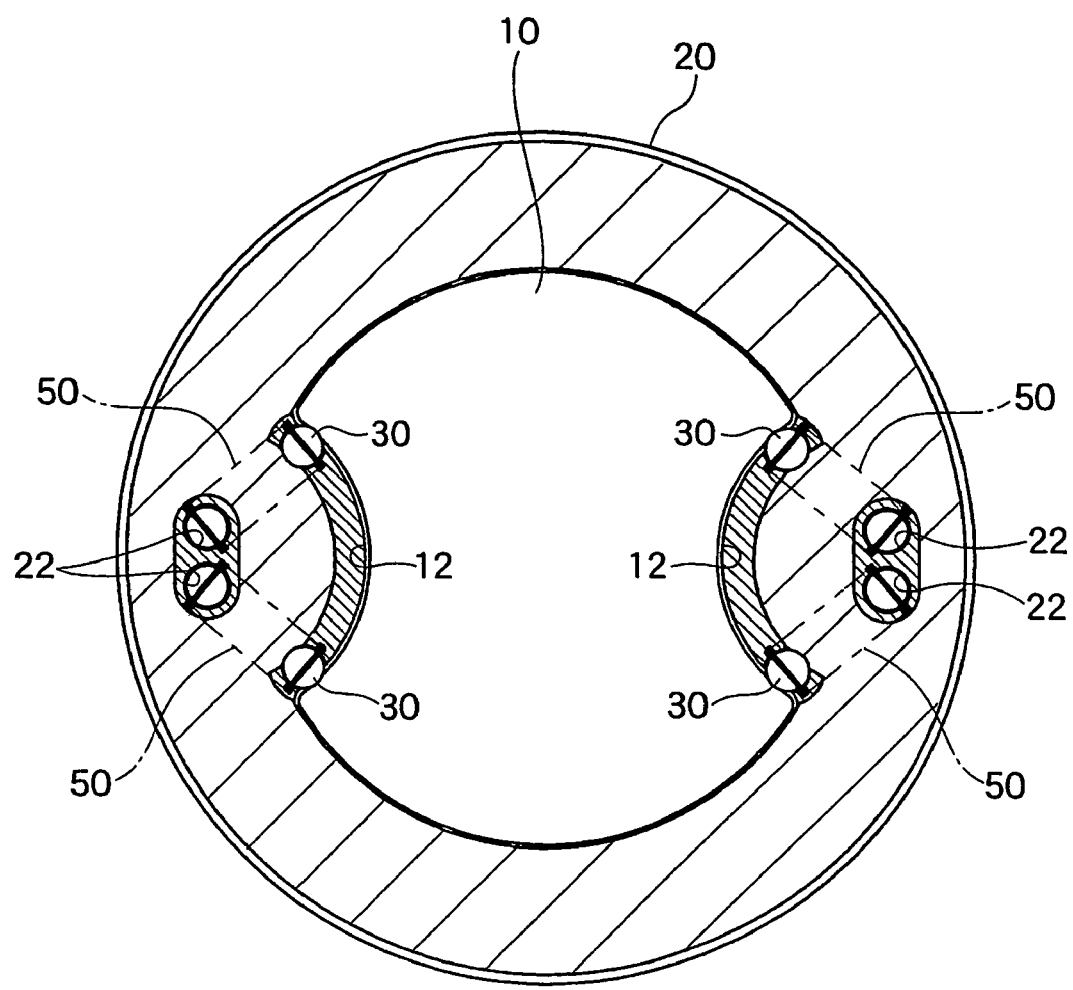
FIG. 8 A front sectional view of a ball spline according to a fifth embodiment of the present invention.

Further, while in the above-described embodiments a reduction in the size of the spline nut 20 is achieved by causing the endless circulation path for the balls 30 receiving the clockwise torque and the endless circulation path for the balls 30 receiving the counterclockwise torque to cross each other, if an increase in the size of the spline nut 20 is permissible, it is also possible, as in the fourth embodiment shown in FIG. 7 and the fifth embodiment shown in FIG. 8, not to cause a pair of endless circulation paths 50, 50 to cross each other, with the ball return passages 22, 22 of the endless circulation paths 50, 50 being adjacent to each other at positions where they divide each torque transmission path 12 of the spline shaft 10 into two. When the adjacent endless circulation paths 50, 50 are not thus caused to cross each other, there is no need for the forming position of one endless circulation path 50 to be deviated in the axial direction of the spline nut 20 with respect to the forming position of the other endless circulation path 50, whereby it is possible to suppress an increase in the axial length of the spline nut 20 as compared with that in the ball spline 1 of the first embodiment.

The invention claimed is:
1. A ball spline comprising:
a spline shaft having a substantially circular sectional configuration, and having in the outer peripheral surface thereof a plurality of lines of longitudinally extending arcuate torque transmission grooves arranged at equal intervals, with the ball rolling faces being formed on side surfaces of land parts situated in between the torque transmission grooves, such that the ball rolling faces are on both sides in the width direction of each torque transmission groove; and
a spline nut formed substantially as a cylinder with a hollow hole into which the spline shaft is fitted, having on an inner peripheral surface of the hollow hole a plurality of lines of load rolling faces which are adjacent in the circumferential direction opposed to the ball rolling faces of the spline shaft;

a large number of balls rolling while receiving a load in the load region formed whereby the ball rolling faces of the spline shaft and the load rolling faces of the spline nut are opposed to each other; and the distance between a pair of rows of balls rolling on the ball rolling faces situated on both sides of each of the land parts is set larger than the distance between a pair of rows of balls rolling on the ball rolling faces on both sides of each of the torque transmission grooves, the spline nut has ball return passages which are formed parallel to the load regions, and are situated in the contact normals (n) of the balls and the ball rolling faces, the spline nut has first ball retaining portions, formed of synthetic resin, which are protruded from the inner peripheral surface of the spline nut, each of the first ball retaining portions is accommodated in the torque transmission groove, and is disposed between a pair of rows of balls rolling on the ball rolling faces on both sides of each of the torque transmission grooves, the spline nut is equipped with an endless circulation path for the balls rolling on the load rolling faces; and a pair of endless circulation paths situated on both sides of each torque transmission groove of the spline shaft cross each other so that one endless circulation path passes through an inside of another endless circulation path.

2. The ball spline according to claim 1, characterized in that, regarding the pair of rows of balls rolling on the ball rolling faces situated on both sides of each land part, the intersection of contact normals of the rows of balls with respect to the ball rolling faces is situated on the outer side of the line connecting the centers of these rows of balls with respect to the radial direction of the spline shaft.

3. The ball spline according to claim 1, the groove walls on both sides in the width direction of each torque transmission groove are substantially perpendicular to the outer peripheral surface of the spline shaft, and at these positions, there are formed the ball rolling faces.

4. The ball spline according to claim 1, the contact normals of the balls with respect to each ball rolling face of the spline shaft are set substantially perpendicular to the radial direction of the spline shaft.

5. The ball spline according to claim 1, wherein the spline nut has second ball retaining portions, formed of synthetic resin, the second ball retaining portions formed into part of the inner peripheral surface of the spline nut, the first ball retaining portion and the second ball retaining portion are disposed on both sides of the load rolling faces of the spline nut.

6. The ball spline according to claim 5, wherein the spline nut has an endless circulation path for circulating balls, and the balls arranged in a row on a coupling belt formed of a flexible synthetic resin to be inserted into the endless circulation path together with the coupling belt, guide grooves for guiding the coupling belt are axially formed in the first ball retaining portions and the second ball retaining portions.

\* \* \* \* \*